United States Patent
Hemeury et al.

(10) Patent No.: US 8,894,012 B2
(45) Date of Patent: Nov. 25, 2014

(54) AIRCRAFT NACELLE INCORPORATING A HOOD CLOSURE DEVICE THAT IS INDEPENDENT OF THE LOCKING MECHANISM

(75) Inventors: Philippe Hemeury, Blagnac (FR); Christian Gerri, Fonsorbes (FR)

(73) Assignee: Airbus Operations SAS, Toulouse (FR)

( * ) Notice: Subject to any disclaimer, the term of this patent is extended or adjusted under 35 U.S.C. 154(b) by 918 days.

(21) Appl. No.: 12/963,238

(22) Filed: Dec. 8, 2010

(65) Prior Publication Data
US 2011/0133489 A1    Jun. 9, 2011

(30) Foreign Application Priority Data
Dec. 9, 2009   (FR) .................................... 09 58790

(51) Int. Cl.
| B64C 1/14 | (2006.01) |
| B64D 29/08 | (2006.01) |
| B64D 29/06 | (2006.01) |
| E05C 19/14 | (2006.01) |
| E05B 17/00 | (2006.01) |
| E05C 5/04 | (2006.01) |

(52) U.S. Cl.
CPC .............. B64D 29/06 (2013.01); B64D 29/08 (2013.01); E05C 19/145 (2013.01); E05C 5/04 (2013.01); E05B 17/0025 (2013.01)
USPC ....................................... 244/129.4; 292/113

(58) Field of Classification Search
USPC ............ 244/129.4, 129.5, 54, 53 R; 292/171, 292/141, DIG. 16, 281, 113
See application file for complete search history.

(56) References Cited

U.S. PATENT DOCUMENTS

| 2,494,347 A | | 1/1950 | Matthews |
| 2,714,032 A | * | 7/1955 | Mills ............................. 292/247 |
| 3,347,578 A | * | 10/1967 | Sheehan et al. ............... 292/113 |
| 4,220,364 A | * | 9/1980 | Poe .......................... 292/341.18 |
| 5,165,148 A | * | 11/1992 | Fleischer et al. ................ 24/494 |
| 2009/0173823 A1 | * | 7/2009 | Shetzer ....................... 244/129.4 |
| 2010/0229526 A1 | | 9/2010 | Germain et al. |

FOREIGN PATENT DOCUMENTS

| EP | 1515006 A1 | 3/2005 |
| EP | 1927711 A2 | 6/2008 |
| FR | 2920137 A1 | 2/2009 |
| FR | 2920141 A1 | 2/2009 |

OTHER PUBLICATIONS

French Search Report, dated Jul. 12, 2010, from corresponding French application.

* cited by examiner

*Primary Examiner* — Brian M O'Hara
(74) *Attorney, Agent, or Firm* — Young & Thompson

(57) ABSTRACT

An aircraft nacelle includes, on its outside surface, at least one opening that is blocked by at least one movable part (16) that is kept in closed position by at least one locking mechanism that connects the movable part (16) to another part of the nacelle (16'), characterized in that it includes an anchoring point (32) on one of the two parts (16') that are to be connected, and a detachable link (34) that is connected to a traction element (36) that is integral with the other part (16) that is to be connected.

10 Claims, 3 Drawing Sheets

AIRCRAFT NACELLE INCORPORATING A HOOD CLOSURE DEVICE THAT IS INDEPENDENT OF THE LOCKING MECHANISM

DETAILED DESCRIPTION OF THE PREFERRED EMBODIMENTS

This invention relates to an aircraft nacelle incorporating a hood closure device that is independent of the locking mechanism.

As illustrated in FIGS. 1 and 2, the power plant of an aircraft is integrated inside a structure, called nacelle 10 below, connected by connecting means to the aircraft, in particular by a mast 12 to the wing 14.

This nacelle has several functions, in particular those of regulating and controlling the movements of air around and in the engine so as to optimize the aerodynamic flow, to protect the engine from outside elements, to minimize noise pollution, to ventilate the internal zones, to participate in the dispersion of mechanical stresses of the engine, and optionally to support the thrust reverser systems.

Finally, the nacelle is to make possible the daily maintenance and the servicing of the engine and its components.

For this purpose, the nacelle comprises, at its outside surface, an opening that allows access to the inside of the nacelle and a movable part 16 that can occupy at least two positions, a first so-called closed position (FIG. 2), in which said movable part is located in the extension of the outside surface of the nacelle so as to block said opening, and a second position in which it at least partially releases the opening (FIG. 1).

For the remainder of the description, the movable part is called a door.

In general, the nacelle 10 comprises two symmetrical doors 16, 16' that are articulated around pivoting axes that are parallel to the longitudinal axis 18 of the nacelle, arranged on both sides of the mast 12.

According to this configuration, the lower edges of the doors 16, 16' are essentially contiguous in closed position and are kept in this position by locking mechanisms 20, illustrated in detail in FIG. 3, dispersed along the lower edges of the doors.

According to one embodiment, each locking mechanism 20 comprises an anchoring point 22 that is provided at the edge of a first door 16 and an articulated hook 24 that is provided at the edge of a second door 16' that can grip the anchoring point 22 so as to connect the two doors and keep them in closed position.

To maneuver the hook 24, the latter comprises a handle 26 that pivots relative to the door 16', whereby the hook 24 is articulated relative to said handle. The articulations between, on the one hand, the door 16' and the handle 26, and, on the other hand, the handle 26 and the hook 24 are arranged in such a way that the hook 24 can grip the anchoring point 22 even if the doors 16, 16' are slightly offset and are not contiguous. Thus, when the hook 24 grips the anchoring point 22, the pivoting of the handle 26 initially tends to draw the two doors together until the two doors are contiguous. Another locking mechanism makes it possible to keep the handle 26 in this position, which corresponds to the closed position of the doors.

This solution is satisfactory as long as the doors are not too far offset before the handle is maneuvered.

In the case of nacelles with large diameters, it is sometimes difficult to draw the two doors fairly close together so that the hook of the locking mechanism that is borne by one of the doors grips the anchoring point that is borne by the other door.

A first solution then consists in modifying the locking mechanism so as to increase the travel of the hook. However, this solution leads to increasing the force that is necessary to the maneuvering of the handle during the closing of the door.

Also, the purpose of this invention is to propose an aircraft nacelle that incorporates a device that makes it possible to draw the doors together independently of the locking mechanism.

For this purpose, the object of the invention is an aircraft nacelle that comprises—at its outside surface—at least one opening that is blocked by at least one movable part that is kept in closed position by at least one locking mechanism that connects said movable part to another part of the nacelle, characterized in that it comprises, on the one hand, an anchoring point on one of the two parts that are to be connected, and, on the other hand, a detachable link that is connected to a traction means that is integral with the other part that is to be connected.

BRIEF DESCRIPTION OF THE DRAWINGS

Other characteristics and advantages will emerge from the following description of the invention, a description that is provided only by way of example, relative to the accompanying drawings in which.

The invention relates to an aircraft nacelle 10 that is connected by connecting means to the aircraft, for example a mast 12 that is connected to the wing 14.

Figure 1:
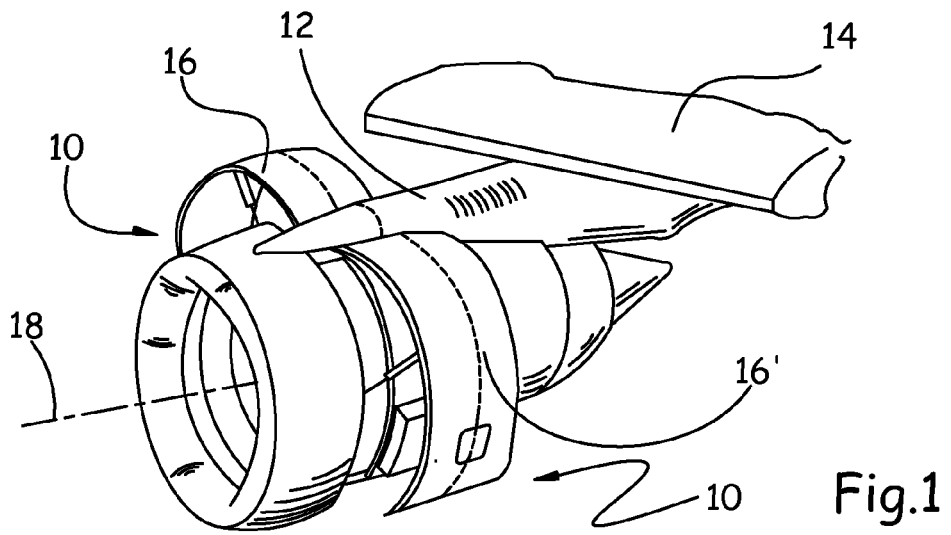
FIG. 1 is a perspective view of an aircraft nacelle with doors in the open position.
Figure 2:
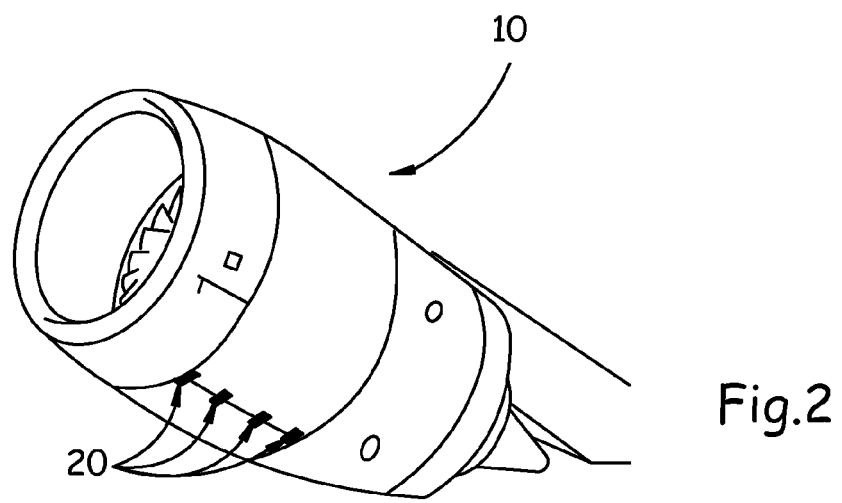
FIG. 2 is a perspective view of the lower portion of an aircraft nacelle with doors in the closed position.
Figure 3:
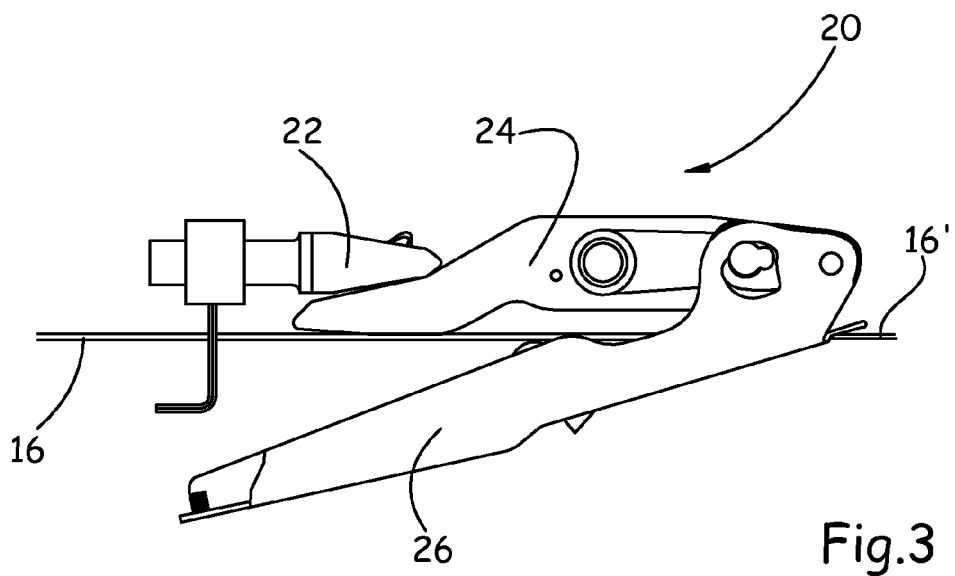
FIG. 3 is a side view of a variant of a locking mechanism of the doors of an aircraft nacelle.

At its outside surface, the nacelle comprises an opening that allows access to the inside of the nacelle and a movable part 16, called a door or hood, able to occupy at least two positions, a first so-called closed position (FIG. 2) in which said movable part is arranged in the extension of the outside surface of the nacelle in such a way as to block said opening, and a second position in which it releases the opening (FIG. 1) at least partially.

In general, the nacelle symmetrically comprises two doors 16, 16' that are articulated around pivoting axes that are parallel to the longitudinal axis 18 of the nacelle, arranged on both sides of the mast 12.

According to this configuration, the lower edges of the doors 16, 16' are essentially contiguous in closed position and are kept in this position by at least one locking mechanism 20.

The nacelle, the doors, and the locking mechanisms are not further described because they are known to one skilled in the art.

In a general manner, the invention relates to a nacelle that comprises at least one opening that is blocked by at least one movable part that is kept in closed position by at least one locking mechanism.

According to the variants, the locking mechanism can make it possible to connect a movable part and a stationary part or a movable part and another movable part that is connected to the nacelle. Also, in a general manner, the locking mechanism makes it possible to connect a first movable part to a second part of the nacelle, whereby this second part can be stationary or movable. The locking mechanisms are sized so as to withstand significant stresses that tend to open the doors.

This locking mechanism can make it possible to draw together the two parts that are to be connected prior to the locking. However, this closure is limited to a relatively small spacing of the two parts that are to be connected.

According to the invention, the nacelle comprises a device 30 for drawing together the two parts that are to be connected that is separate from the locking mechanism(s).

On the one hand, this device 30 comprises an anchoring point 32 on one of the two parts 16', and, on the other hand, it comprises a detachable link 34 that is connected to a traction means 36 that is integral with the other part 16.

According to one embodiment, the anchoring point 32 comprises a rod 38 whose ends are supported by the wings of a yoke 40 that is integral with one of the parts 16 that are to be connected. However, other solutions can be considered for connecting the rod 38 to one of the parts 16' that are to be connected.

According to one embodiment, the detachable link 34 comes in the form of a strap 42 of which a first end 44 is attached to the traction means 36 and of which the other end 46 is connected in a detachable manner by means of a hooking means to the traction means 36, whereby the strap 42 thus forms a loop that can surround the rod 38 of the anchoring point 32. The strap 42 can be made of fabric from coated fibers (for example, fibers marketed under the trademark Kevlar®).

According to one embodiment, the traction means 36 comprises a nut 48 to which is connected the detachable link 34 and a screw 50 whose longitudinal axis 52 is arranged in the direction of traction and that comprises a threaded zone 54 that works with the nut 48.

The nut 48 comprises a slot at which is placed a rod 56, for example a pin, which can be used as a hooking point to a hook 58 that is provided at the end 46 of the detachable link 34.

The screw 50 is connected to a part that is to be connected using a "sliding pivot" connection. Thus, the screw 50 comprises a first bearing surface 60 that is mounted to slide in a bore that is made in a first support 62 that is connected at one of the parts 16 that is to be connected, and a second surface bearing 64 that is mounted to slide in a bore that is made in a second support 66 that is connected to the part 16 that is to be connected, whereby the surface bearings 60 and 64 are arranged on both sides of the threaded zone 56 and allow a rotational and translational movement of the screw.

The screw 50 extends beyond the support 62 that is the farthest from the anchoring point 32 and at this end comprises a means 68 for driving in rotation the screw in the form of, for example, a roller of hexagonal shape, a driving square, or the like.

The use of such a device is relatively simple.

Figure 4:
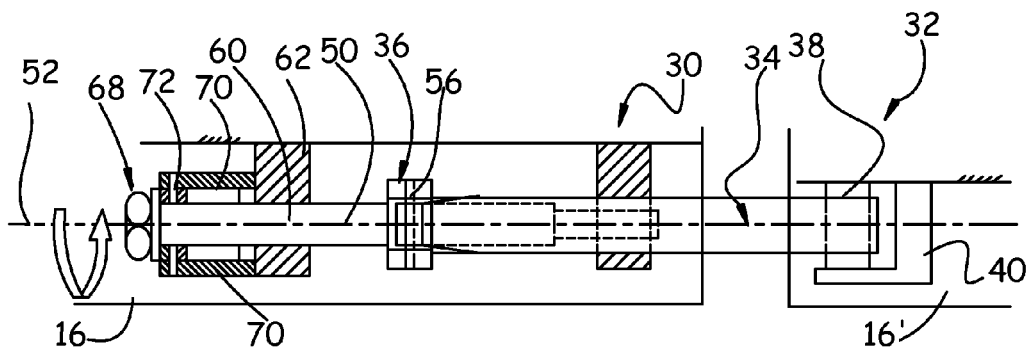
FIG. 4 is a top view of a device for drawing doors together according to the invention, whereby the doors are offset.
Figure 5:
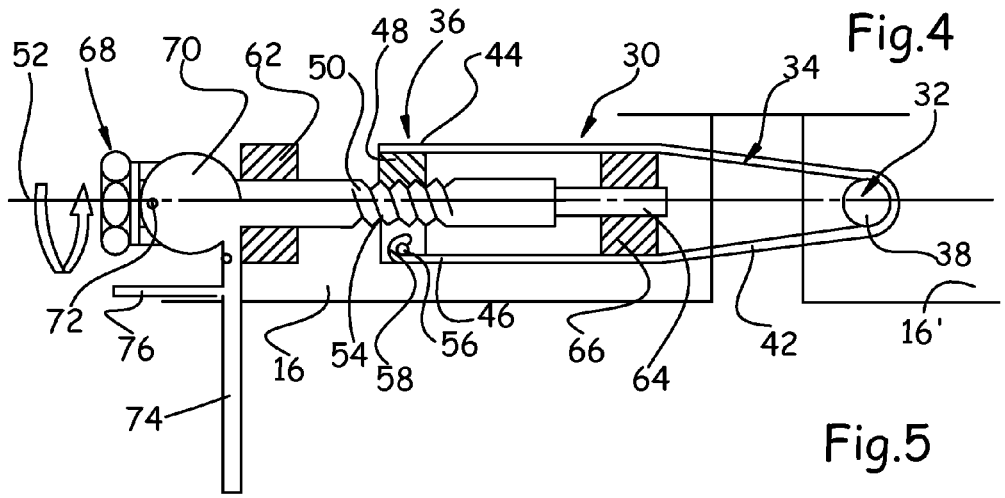
FIG. 5 is a side view of the door closure device of FIG. 4, whereby the doors are offset.

As illustrated in FIGS. 4 and 5, the doors 16 and 16' are too offset to be able to lock them using locking mechanisms.

Initially, the user is to make the detachable link 34 integral with the anchoring point 32. In a first step, if necessary, he brings the nut 48 close to the second support 66. Next, he releases the hook 58 that is provided at the end of the strap 42 so as to run it behind the anchoring point 32, and then he reattaches the hook 58. In this configuration, the rod 38 of the anchoring point is arranged in the loop that is formed by the strap 42.

Figure 6:
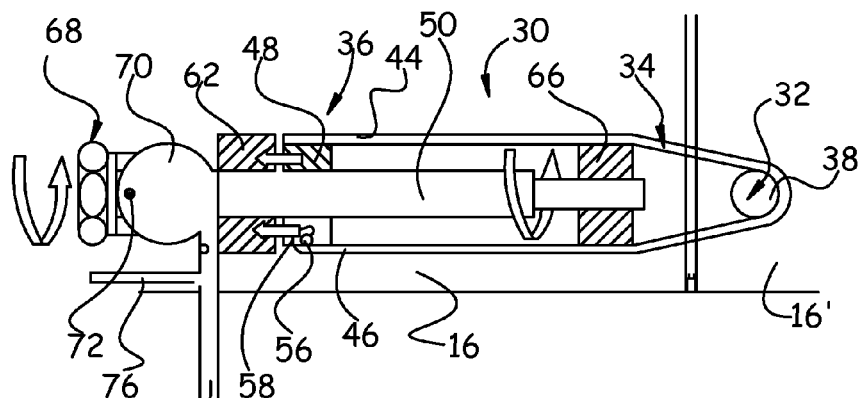
FIG. 6 is a side view of the door closure device of FIG. 4, whereby the doors are drawn together.

Next, he maneuvers the screw 50 so as to cause the translation of the nut 48 in such a way as to move the anchoring point 32 away until the two doors 16, 16' are drawn fairly close together, as illustrated in FIG. 6, in such a way as to allow the locking mechanisms to operate.

Advantageously, the device comprises means for releasing the tension of the detachable link 34 when the locking mechanisms are in the locked state. For this purpose, the device comprises at least one cam 70 that is arranged between the driving means 68 and the first support 62. According to one embodiment, the cam 70 comprises two disks on both sides of the screw 50 that are able to pivot around an axis 72 that is integral with a ring that is mounted on the screw 50 and that is eccentric relative to the center of the disks, whereby the latter are connected by a handle 74. The cam 70 is positioned so that the edges of the disks rest against the first support 62.

As illustrated in FIG. 6, during the closure maneuvering of the doors, the cam 70 occupies a first position in which it tends to keep the screw 50 and the anchoring point 32 and the taut detachable link 34 separated.

Figure 7:
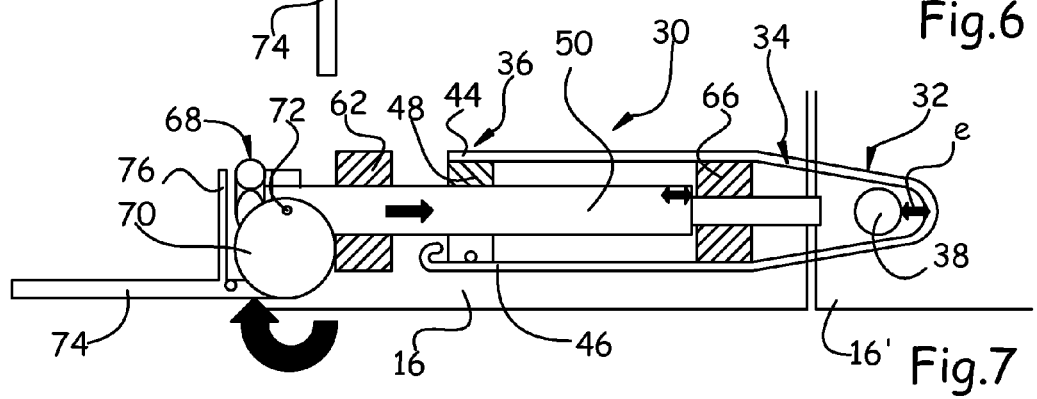
FIG. 7 is a side view of the door closure device of FIG. 4, whereby the doors are locked.

When the locking mechanisms are in the locked state, the cam 70 can be maneuvered so as to occupy a second state in which it makes it possible for the screw 50 to move translationally toward the anchoring point 32 so as to extend the detachable link 34 as illustrated in FIG. 7.

When the cam 70 occupies the first position, the handle 74 is positioned essentially perpendicular to the longitudinal axis 52 of the screw 50. When the cam 70 occupies the second position, the handle 74 is positioned essentially parallel to the longitudinal axis 52 of the screw 50.

Thus, the handle 74 can be used as an indicator on the state that is closed or not of the door, whereby the handle 74 projects relative to the aerodynamic surface when the door(s) is/are not closed.

The arrangement of the pivoting axis 72 of the cam 70 and the dimensions of the cam 70 are such that when the cam 70 switches from one state to the next, the screw 50 can move translationally by a certain distance e (visible in FIG. 7) ensuring that the closure device is not excessively loaded due to the separation of the doors during flight.

Preferably, a holding means is provided for preventing any movement of the strap during flight when the latter is in the extended state.

Figure 8:
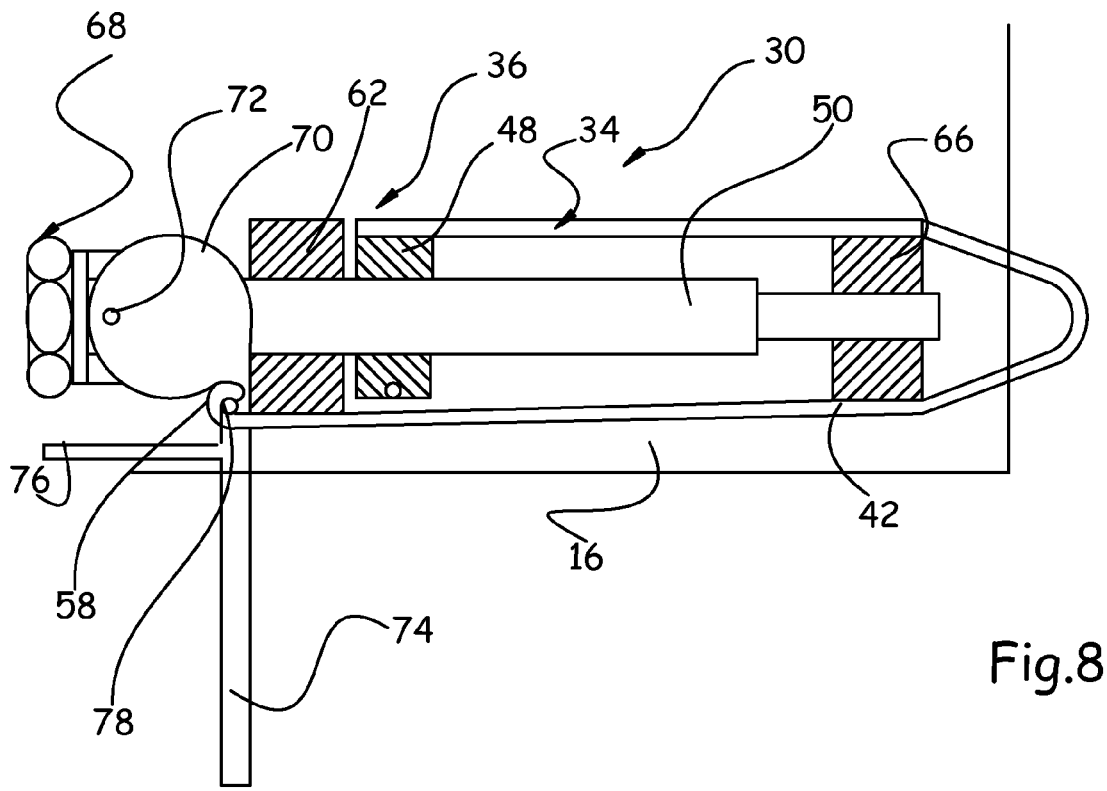
FIG. 8 is a side view of the door closure device of FIG. 4, the strap extended prior to its stowage.
Figure 9:
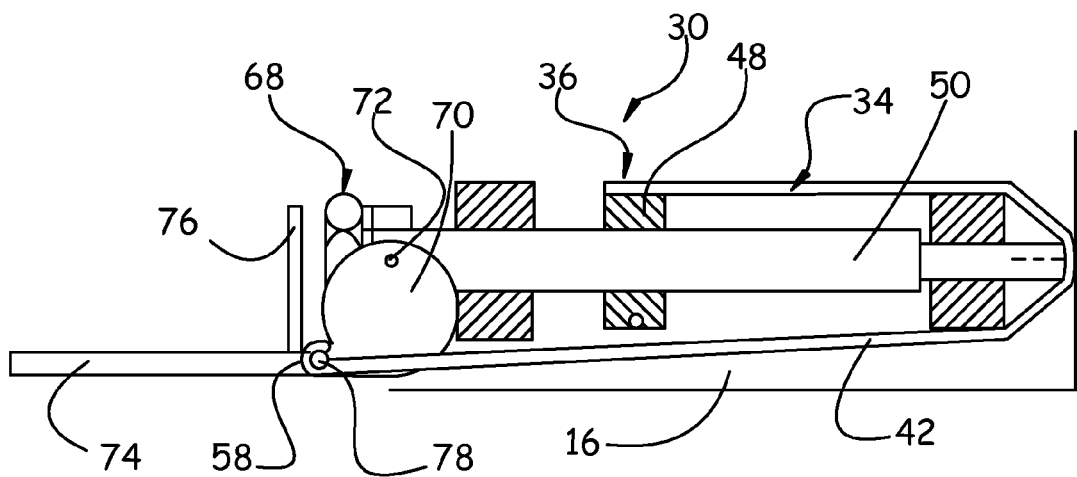
FIG. 9 is a side view of the door closure device of FIG. 4, whereby the strap is stowed taut.

Advantageously, the closure device comprises means 76 that can prevent access to the driving means 68, for example a plate that is integral with the handle 74 and that extends perpendicular to said handle 74. According to one variant that is illustrated in FIGS. 8 and 9, the handle 74 can comprise an anchoring point 78 for the hook 58 that is provided at the end of the strap 42. This solution makes it possible to be able to stow the strap on the ground.

The user arranges the handle 74 in advance perpendicular to the longitudinal axis 52 of the screw and hooks the hook 58 to the anchoring point 78, as illustrated in FIG. 8. To extend the strap 42, he rocks the handle 74, as illustrated in FIG. 9, in such a way that the strap rests against the end of the screw 50 that is oriented toward the anchoring point 32.

The invention claimed is:

1. An aircraft nacelle, comprising:
an outside surface with at least one opening that is blocked by at least one movable first part (16) and a second part (16'), said first and second parts (16, 16') configured to be connected in a closed position by at least one locking mechanism (20) that connects said first part (16) to said second part (16'); and a closure device (30), comprising
- an anchoring point (32) on one of the first and second parts to be connected, and
- a detachable link (34) that is detachably connectable to a traction means (36) that is integral with the other of the first and second parts, wherein the detachable link (34) comprises a strap (42), a first end (44) of the strap being attached to the traction means (36), and a second end (46) of the strap connectable in a detachable manner to the traction means (36) via a hooking means located at the second end, whereby the strap (42), when connected via the hooking means to the traction means, forms a loop in which the anchoring point (32) can be arranged.

2. The aircraft nacelle according to claim 1, wherein the traction means (36) comprises a nut (48), the detachable link (34) being connected thereto, and a screw (50) having a longitudinal axis (52) arranged in a direction of traction, said screw (50) having thereon a threaded zone (54) configured to engage in a threaded manner with threads of the nut (48).

3. The aircraft nacelle according to claim 2, wherein an end of the screw farthest from the anchoring point (32) comprises a driving means (68) for driving the screw (50) in rotation.

4. The aircraft nacelle according to claim 3, wherein the closure device (30) further comprises means (76) for preventing access to the driving means (68).

5. The aircraft nacelle according to claim 1, wherein the closure device (30) further comprises means for releasing tension from the detachable link (34) when said at least one locking mechanism is in a locked state.

6. The aircraft nacelle according to claim 1, wherein the closure device (30) further comprises
- a screw (50) configured such that the traction means (36) can slide along a longitudinal axis (52) of the screw (50), and
- a cam (70) moveable relative to the screw (50) so as to occupy, in a first mode, a first position in which the cam (70) tends to keep the detachable link (34) taut and the screw (50) and the anchoring point (32) separated, and, in a second mode, a second position in which the cam (70) allows movement of the screw (50) toward the anchoring point (32) in such a way as to extend the detachable link (34) in a direction of the anchoring point (32).

7. The aircraft nacelle according to claim 6, wherein the cam (70) comprises a handle (74) configured for maneuvering the cam (70).

8. The aircraft nacelle according to claim 7, wherein the handle (74) supports a plate (76) that can prevent access to the driving means of the screw (50).

9. The aircraft nacelle according to claim 7, wherein the handle (74) is arranged perpendicular to the longitudinal axis (52) in the first position.

10. The aircraft nacelle according to claim 9, wherein the handle (74) supports a plate (76) that can prevent access to the driving means of the screw (50).

* * * * *